(12) United States Patent
Morollon

(10) Patent No.: US 9,488,539 B2
(45) Date of Patent: Nov. 8, 2016

(54) DEVICE FOR DETERMINING THE TORQUE APPLIED TO A CRANKSET SHAFT

(71) Applicants: CONTINENTAL AUTOMOTIVE FRANCE, Toulouse (FR); CONTINENTAL AUTOMOTIVE GmbH, Hannover (DE)

(72) Inventor: Manuel Morollon, Colomiers (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 14/997,062

(22) Filed: Jan. 15, 2016

(65) Prior Publication Data
US 2016/0209282 A1    Jul. 21, 2016

(30) Foreign Application Priority Data

Jan. 21, 2015 (FR) ...................... 15 50459

(51) Int. Cl.
*G01L 3/00* (2006.01)
*G01L 3/10* (2006.01)
*G01L 3/04* (2006.01)

(52) U.S. Cl.
CPC ............. *G01L 3/108* (2013.01); *G01L 3/04* (2013.01); *G01L 3/10* (2013.01)

(58) Field of Classification Search
CPC ......... G01L 3/101; G01L 3/10; G01L 3/109; G01L 3/08; G01L 3/1457; G01L 25/003; G01L 3/24
USPC ..................... 73/862.328, 862.325, 862.326, 73/862.321, 862.191, 862.08, 862
See application file for complete search history.

(56) References Cited

U.S. PATENT DOCUMENTS

| 7,861,599 B2* | 1/2011 | Meggiolan | G01L 3/108 73/760 |
| 8,015,886 B2* | 9/2011 | Lohr | G01L 3/1428 73/862.326 |

(Continued)

FOREIGN PATENT DOCUMENTS

| CN | 203 255 334 U | 10/2013 |
| DE | 10 2007 040016 A1 | 2/2009 |

(Continued)

OTHER PUBLICATIONS

FR Search Report, dated Aug. 26, 2015, from corresponding FR application.

*Primary Examiner* — Lisa Caputo
*Assistant Examiner* — Nigel Plumb
(74) *Attorney, Agent, or Firm* — Young & Thompson

(57) ABSTRACT

A device (1) for determining the torque applied to a crankset shaft (10) moveable in rotation about an axis of rotation, includes a supporting element (50). The crankset shaft (10) has two separate parts that are moveable in rotation, the supporting element being designed to keep the two parts substantially coaxial with the axis of rotation. Furthermore, the two parts have respective contact elements designed to transform the rotational movement of one of the two parts into a simultaneously translational and rotational movement of the other of the two parts, as well as stop element designed to cooperate with the supporting element. The device also has at least one sensing element (80) designed to provide a signal representing a mechanical stress applied to the at least one sensing element, and a processing module configured to determine the torque as a function of the signal.

17 Claims, 3 Drawing Sheets

(56) References Cited

U.S. PATENT DOCUMENTS

| | | | |
|---|---|---|---|
| 2004/0200294 A1* | 10/2004 | Tsay | B62M 6/45 73/862.322 |
| 2007/0182122 A1* | 8/2007 | Smith | B62M 3/003 280/256 |
| 2011/0167920 A1* | 7/2011 | Rink | G01D 5/2451 73/760 |
| 2011/0179862 A1* | 7/2011 | Grab | A63B 22/0605 73/379.01 |

FOREIGN PATENT DOCUMENTS

| | | |
|---|---|---|
| EP | 1 466 824 A2 | 10/2004 |
| EP | 1 978 342 A2 | 10/2008 |
| JP | H08 276887 A | 10/1996 |
| WO | 2006/045150 A1 | 5/2006 |

* cited by examiner

DEVICE FOR DETERMINING THE TORQUE APPLIED TO A CRANKSET SHAFT

FIELD OF THE INVENTION

The present invention relates to the domain of measuring the torque applied to a part that is moveable in rotation. More specifically, it relates to a device for determining the torque applied to a crankset shaft. The present invention can be particularly advantageously used in torque measurement devices on cycles, without being limited to such use.

BACKGROUND OF THE INVENTION

There are currently different devices used to determine the torque applied to a part that is moveable in rotation. Said part is usually built into a mechanical system including numerous elements intended to transmit mechanical energy from the input to the output of said mechanical system.

Such devices are for example used to measure the torque applied to a transmission shaft, positioned at the engine output in a passenger vehicle. In the conventional case of a motor vehicle, these devices for example make it possible to check that the engine is transmitting power to other elements of said vehicle, such as the wheels or the alternator, in accordance with a prescribed efficiency target.

The present invention relates to a cycle transport vehicle, such as a bicycle, in which a user exerts a force on pedals linked to a crankset shaft that is rotated by said force.

In addition to checking the correct transfer of power from one end of a mechanical system to the other, such devices are also specifically required to check that the intensity of the torque applied does not exceed a given value, beyond which said torque could have a twisting effect on the shaft. For example, in the case of twisting of the crankset shaft of an electric bicycle, such a check is intended to enable the triggering of an electric motor participating in the effort required to move the bicycle, thereby contributing to the comfort of the user.

Conventionally, such an on-board device includes, in addition to a specific supporting element enabling the installation of same in said means of transport:
  a shaft driven in rotation by said torque,
  sensing elements able to provide a signal representing a stress applied to said at least one sensing element under the effect of said torque,
  means for routing said signal to a processing module configured to determine said torque as a function of said signal.

There are currently several types of device used to determine the torque applied to a rotating shaft. In general, they detect mechanical deformations of the shaft, for example extensions or contractions, or of certain magnitudes related to such deformations caused by said torque, using strain gauges.

Sensing elements, such as said strain gauges, are usually in direct contact with the rotating shaft, and therefore work under torsion. These latter are consequently subject to high stresses, making the implementation and use of the device not very robust.

Such layouts are also used for the routing means, on account of which it is important to take into account the phenomena of wear and periodic maintenance, in particular. More recent systems, such as differential-coupling rotary transformers, combine contactless sensing elements with contactless routing elements, but they remain equally dependent on complex electronic support, and are therefore difficult to carry on board.

SUMMARY OF THE INVENTION

The present invention is intended to overcome some or all of these drawbacks in the prior art, in particular those set out above, by proposing a solution providing devices for determining the torque applied to a rotating shaft of a vehicle, including sensing elements not in contact with said rotating shaft that are designed to supply a signal that can be measured by a processing module that is also not in contact with said rotating shaft.

For this purpose, the invention relates to a device for determining the torque applied to a crankset shaft moveable in rotation about an axis of rotation, notably the crankset of a cycle, and including a supporting element. Furthermore, said device is arranged such that:
  the crankset shaft has two separate parts: a first part and a second part that are respectively moveable in rotation about an axis of rotation,
  the supporting element is designed to keep the first part and the second part substantially coaxial with the axis of rotation of the shaft of the crankset,
  said two parts have respective contact means designed to transform the rotational movement of one of said two parts into a simultaneously translational and rotational movement of the other of said two parts, the contact means being the respective extremities of the two parts, arranged facing one another along the axis of rotation of the shaft of the crankset, said extremities having respectively at least one flat contact surface that is not parallel and not orthogonal to the axis of rotation, said respective contact surfaces of said extremities being designed to bear against one another.
  said two parts have stop means designed to cooperate with said supporting element to limit the amplitude of the relative translational movement of said two parts,
  the device has at least one sensing element arranged between the stop means and the supporting element that is designed to supply a signal representing a mechanical stress applied to said at least one sensing element.
  the device has a processing module configured to determine the torque applied to the crankset shaft as a function of the signal supplied by said at least one sensing element.

In specific embodiments, the device for determining the torque applied to a crankset shaft may also include one or several of the following characteristics, taken individually or in any technically possible combination.

In a specific embodiment, the respective contact surfaces of the two parts are each contained in a plane inclined at an angle θ in relation to the axis of rotation of the shaft 10 of the crankset, said angle θ having a value, modulo 90°, within the range [40°, 50°].

In a specific embodiment, the contact means include ball bearings arranged between the contact surfaces of said two parts.

In a specific embodiment, the left- and right-hand extremities each have a contact shoulder constrained to rotate and move in translation with respectively the first part and the second part, and to which the contact surfaces belong.

In a specific embodiment, the supporting element has lateral walls rigidly connected to one another with through holes formed such that said two parts are engaged therein.

In a specific embodiment, said stop means are two respective stop shoulders of said two parts that are constrained to move in translation and rotation with said two parts, and designed to cooperate with the lateral walls of the supporting element.

In a specific embodiment, said at least one sensing element is a piezoresistive or piezoelectric sensor.

In a specific embodiment, the device has means for transmitting the translational movement toward said at least one sensing element that are arranged between said at least one sensing element and said stop means, said transmission means including:
  a transmission support that is movable in translation and bears against the at least one sensing element,
  means for reducing friction between said transmission support and the stop means.

In a specific embodiment, said friction reducing means are two tapered roller bearings arranged between said transmission support and said stop means.

In a specific embodiment, said transmission means include guide means arranged to enable said transmission support to move along the axis of rotation of the shaft of the crankset.

The characteristics and advantages of the invention are set out in greater detail in the description below, which sets out the characteristics of the invention using preferred embodiments, which are non-limiting.

BRIEF DESCRIPTION OF THE DRAWINGS

The description is based on the attached figures, which show.

DETAILED DESCRIPTION OF THE INVENTION

The present invention relates to the domain of determining the torque applied to a rotating shaft of a transport vehicle, and is carried on board said transport vehicle.

Figure 1:
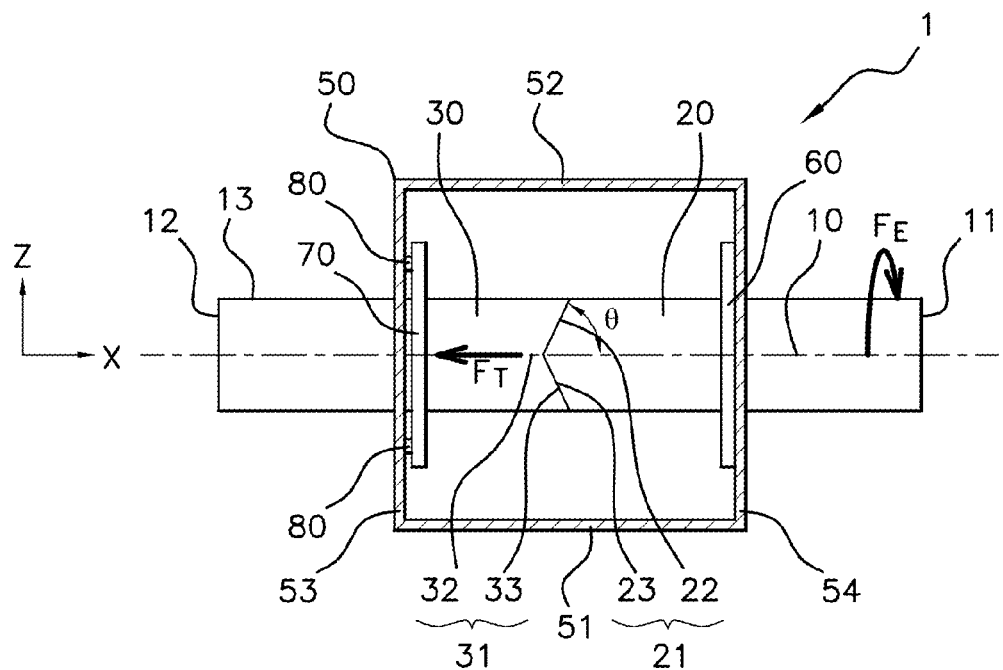
FIG. 1: a schematic representation of an example embodiment of a device for determining the torque applied to a crankset shaft, according to the invention.

FIG. 1 is a schematic representation of an example embodiment of a device 1 for determining the torque applied to a rotating shaft, showing a cross section of the device 1 according to the invention.

The remainder of the description concerns, specifically but without limitation, a device 1 carried on a cycle (not shown in the figures) of a known type, for example an electric bicycle.

In the remainder of the description, the right- and left-hand sides of the cycle shall mean the sides located to the right and to the left of the user when they are using said cycle to move in a conventional manner.

Moreover, parallelism of two lines in the space of the third dimension if there is a single plane containing both of said lines is established, such that both of said lines are parallel, in the sense of the normal definition of parallelism in the space of the second dimension, in said plane. By analogy, this restriction also applies to all elements in the first dimension, such as rays and line segments.

Such a cycle notably includes a crankset with a shaft 10 designed to be rotated about an axis of rotation.

The device 1 includes the shaft 10 of the crankset. Said shaft 10 of the crankset is rigid and made for example by machining or casting of metal materials. Preferably, said shaft 10 of the crankset is made of steel.

The remainder of the description relates to a non-limiting scenario in which the shaft 10 of the crankset is a cylinder based on two geometrically identical disks contained in two distinct, parallel planes:
  a disk 11, referred to as the "right-hand disk", arranged on the right-hand side of the cycle,
  a disk 12, referred to as the "left-hand disk", arranged on the left-hand side of the cycle,
  including a peripheral surface 13 joining the edges of said right- and left-hand disks 11, 12.

The axis of rotation of the shaft 10 of the crankset is in this case the line linking the respective centres of the right- and left-hand disks 11, 12. Furthermore, each disk is rigidly connected to a pedal against which the user pushes to move. The shaft 10 of the crankset may be a different shape, such as a beam with a square base, or a truncated cone based on two disks that are not geometrically identical.

The right- and left-hand disks 11, 12 of the shaft 10 of the crankset are arranged such that when rotary forces are applied thereto, each rotary force being contained in a plane orthogonal to the axis of rotation of said shaft 10 of the crankset, the resultant force on the shaft 10 of the crankset of said rotary forces is a moment of force, referred to as "torque" in the remainder of the description.

For example, in the case of a device carried on an electric bicycle, said torque results from the force exerted by a user alternately on each pedal.

An axis X relative to the device 1 for determining the torque applied to the shaft 10 of the crankset is hereby established, for the remainder of the description. The direction of said axis X is the axis of rotation of said shaft 10 of the crankset. Furthermore, said axis X is oriented from said left-hand disk 12 towards said right-hand disk 11. An axis Z with a direction normal to the plane in which the cycle is designed to rest when in use, and oriented from said plane towards said cycle, is also established. The orthogonal system XZ formed by said two axes X and Z is shown, by way of a non-limiting example, in FIG. 1.

The concepts of left, right, top, bottom, upper, lower, etc. relating to the device 1 are defined in relation to the system XZ. Furthermore, the positive direction of measurement of an angle in the system XZ is the direction from the axis X towards the axis Z. In the remainder of the description, the convention of measuring all angles in the positive direction is used.

The shaft 10 of the crankset has two separate parts that are moveable in rotation respectively about an axis of rotation. Said two separate parts are a part 20 referred to as the "first part" and a part 30 referred to as the "second part", arranged such that said first part 20 is positioned as an extension to said second part 30, along the axis of rotation of the shaft 10 of the crankset.

In the non-limiting example shown in FIG. 1, said two separate parts form a partition of the shaft 10 of the crankset along the axis of rotation of same. Each of said separate parts has a right-hand extremity and a left-hand extremity. Since the shaft 10 of the crankset is divided into two separate parts, the right-hand extremity of said first part 20 includes said right-hand disk 11 and the left-hand extremity of said second part includes said left-hand disk 12. Furthermore, said two separate parts are arranged such that the respective axes of rotation coincide substantially with the axis X.

Said two separate parts include contact means designed to transform the rotational movement of one of said separate parts into a simultaneously translational and rotational movement of the other of said separate parts.

For example, said contact means include a left-hand extremity 21 of the first part 20, as well as a right-hand extremity 31 of the second part 30, said left- and right-hand extremities 21, 31 being arranged facing one another along the axis X. Said left- and right-hand extremities 21, 31 have respectively at least one flat contact surface that is not parallel and not orthogonal to the axis X. Furthermore, the contact means are designed such that said contact surfaces are preferably parallel to one another and designed to bear against one another. For this purpose, and as shown without limitation in FIG. 1, each contact surface of the left-hand extremity 21, contained within a plane inclined at an angle θ in relation to the axis X, is positioned in contact, along the surface of same, with a single contact surface of the right-hand extremity 31, contained within a plane inclined at an angle to the axis X that is also equal to θ. Consequently, the first and second parts 20, 30 have an identical number of contact surfaces. In other embodiments not detailed here, the first and second parts 20, 30 may have a different number of contact surfaces, provided that at least one contact surface of said first part 20 is in contact with a contact surface of said second part 30 and cooperates with same such as to transform the rotational movement of one of the two parts into a simultaneously translational and rotational movement of the other of the two parts.

In the non-limiting example shown in FIG. 1, said left- and right-hand extremities 21, 31, of the first part 20 and the second part 30 respectively, each have two contact surfaces:

an upper left contact surface 22 (respectively upper right 32) contained in a plane inclined at an angle of 60° to the axis X and extending from the peripheral surface 13 located above the axis X towards said axis X, a lower left contact surface 23 (respectively lower right 33) contained in a plane inclined at an angle of 60° to the axis X and extending from the peripheral surface located beneath the axis X towards said axis X.

Such a geometric arrangement is designed such that the first and second parts 20, 30 cooperate via contact means, said upper left and upper right contact surfaces 22, 32 (respectively lower left 23 and lower right 33) being in contact along the entire surface of same.

In an alternative embodiment, said at least one contact surface of said left-hand extremity 21 is curved and configured such that, in the plane XZ, the chord linking the two extremities of said at least one curved contact surface belongs to a flat surface inclined identically to the one described above. Moreover, said at least one contact surface of said right-hand extremity 31 is configured using the same geometric characteristics as said at least one contact surface of said left-hand extremity 21.

The device 1 also has a supporting element 50 designed to keep said two separate parts substantially coaxial to the axis of rotation of the shaft 10.

In the non-limiting example shown in FIG. 1, said supporting element 50 is a rigid hollow parallelepiped housing comprising:

a lower wall 51 substantially orthogonal to the axis Z and positioned below the shaft of the crankset, an upper wall 52 opposite said lower wall in relation to the shaft 10 of the crankset, the lateral walls, rigidly connected to one another by said lower and upper walls 51, 52.

For example, the assembly formed by said lateral walls has a left-hand lateral wall 53 and a right-hand lateral wall 54 orthogonal to the axis X. Said left-hand lateral wall 53 (respectively right-hand lateral wall 54) has a through-hole of circular section with an axis of revolution parallel to the axis X, and is at least as large as the diameter of the second part 30 (respectively of the first part 20). Said through-hole of said left-hand lateral wall 53 (respectively right-hand lateral wall 54) is arranged such that the second part 30 (respectively the first part 20) is engaged therein. Furthermore, the relative position of the through-holes is such that, once inserted into said through-holes, the first and second parts 20, 30 are kept coaxial. Other embodiments, not detailed here, may have a supporting element 50 with no lower wall 51 or upper wall 52, provided that the lateral walls are rigidly connected together, or have a supporting element that is a housing in a form other than a parallelepiped.

The device has stop means designed to cooperate with said supporting element 50 to limit the amplitude of the relative translational movement of said two separate parts.

In the non-limiting example shown in FIG. 1, said stop means are two peripheral shoulders referred to as "stop shoulders":

a first stop shoulder 60 of the first part 20, which is larger than the diameter of said first part 20, constrained to move in rotation and translation with said first part 20, and arranged between the left-hand extremity of said first part 20 and the right-hand lateral wall 54, a second stop shoulder 70 of the second part 30, which is larger than the diameter of said second part 30, constrained to move in rotation and translation with said second part 30, and arranged between the right-hand extremity of said second part 30 and the left-hand lateral wall 53, Furthermore, the first and second stop shoulders 60, 70 are larger than the through-holes passing through the right- and left-hand lateral walls 54, 53 respectively, and they are designed to cooperate with the right- and left-hand lateral walls 54, 53 respectively. Accordingly, the amplitude of translational movement, along the axis X, of the right-hand moveable part 20 (respectively left-hand moveable part 30) is limited.

The device 1 also has at least one sensing element 80 arranged between said stop means and said supporting element 50 that is designed to supply a signal representing a mechanical stress applied to said at least one sensing element 80. Such an arrangement is advantageous in that said at least one sensing element is not in contact with the shaft 10 of the crankset.

In the non-limiting example shown in FIG. 1, the device 1 has at least two sensing elements 80 arranged between and in contact with the left-hand lateral wall 53 of the static supporting element 50 and the second stop shoulder 70. For example, said at least two sensing elements 80 are affixed by gluing, welding or any other means to said left-hand lateral wall 53, and are arranged on said left-hand lateral wall 53 facing the second shoulder 70 on either side of the through-hole. In the present example embodiment, the first stop shoulder 60 is in contact with the right-hand lateral wall 54. Other examples not shown may have a plurality of sensing elements 80 distributed, uniformly or otherwise in number, between the left-hand lateral wall 53 and the second shoulder 70, and between the right-hand lateral wall 54 and the first shoulder 60. This latter arrangement is advantageous, for example in the case of an electric bicycle in which a user pushes alternately on the pedals, thereby alternating the position of the torque between one extremity of the shaft 10 of the crankset and the other.

In a specific embodiment, said at least one sensing element 80 is a piezoresistive sensor, i.e. a variable resistor made from piezoresistive material, such as silicon.

In another specific embodiment, said at least one sensing element 80 is a piezoelectric sensor producing an electrical voltage under the effect of compression, preferably made of a PZT material (lead zirconate titanate).

The device also has a processing module (not shown in the figures). Said processing module includes an assembly of configured software means (specific computer program product) and/or hardware means (FPGA, PLD, ASIC, etc.) to determine the torque applied to the shaft 10 of the crankset as a function of the signal supplied by said at least one sensing element 80.

The remainder of the description relates to a non-limiting scenario in which a rotary force is applied to the right-hand extremity of the first part 20 and said at least one sensing element is a piezoresistive sensor.

On account of said rotary force, said first part 20 is driven in rotation, each material point of said first part 20 being subject to a local drive force $F_E$ oriented along an axis parallel to the axis Z. Said drive force $F_E$ is transmitted to the second part 30, via each contact surface, with a contact force $F_C$ defined as the projection of $F_E$ along the normal to each said contact surface. If said contact surfaces are not orthogonal to the axis X, said force $F_C$ is not null. Since said contact surfaces are also not parallel to the axis X, said contact force $F_C$ has a non-null component $F_T$ on the axis X, representing a translational force along the axis X exerted by the first part 20 on the second part 30. Using the notation |F| to designate, in the classical mathematical sense, the Euclidean rule of a two-dimensional vector quantity F or the absolute value of a scalar quantity, the intensity of the force $F_T$ is given by the following formula:

$$|F_T| = |F_E| \times |\cos(\theta)| \times |\sin(\theta)|.$$

The expression of $|F_T|$ shows that the transformation of the rotational movement of one of said two separate parts into a translational movement of the other of said two separate parts is partial to the extent that the product $|\cos(\theta)| \times |\sin(\theta)|$ is strictly between 0 and 1.

Consecutive with the translational movement of the second part 30, the second stop shoulder 70 compresses said at least one sensing element 80. Thus, the stop means ensure the transfer of the force $F_T$ to said at least one sensing element 80, which works under compression.

Consequently, said processing module uses the signal provided by said at least one sensing element 80 to determine the torque applied to the shaft 10 of the crankset.

Furthermore, on account of the shape of the contact means, the first part 20 also drives the second part 30 in rotation. Indeed, the rotational movement is transmitted by the contact surfaces of said first part 20 bearing against the contact surfaces of said second part 30.

Figure 2:
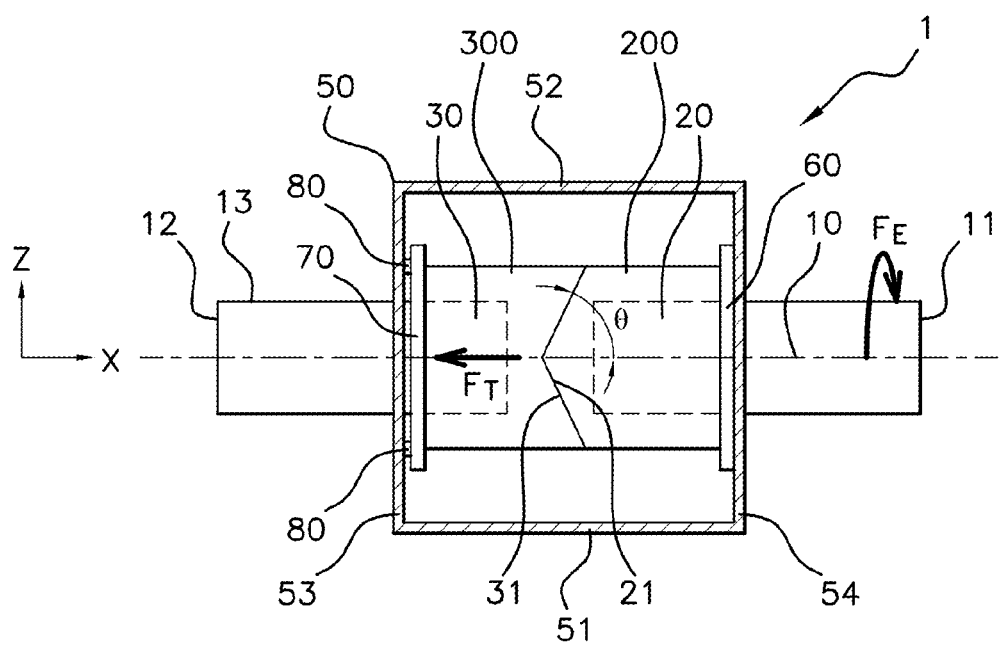
FIG. 2: a schematic representation of a specific embodiment of the device in FIG. 1, including contact shoulders, according to the invention.

FIG. 2 is a schematic representation of a specific embodiment of the device 1 in FIG. 1, showing a cross section of the device 1 in which the left- and right-hand extremities 21, 31 include respectively a first contact shoulder 200 and a second contact shoulder 300. Said first and second contact shoulders 200, 300 are peripheral, larger than the diameter of the first and second parts 20, 30 respectively, and constrained to move in rotation and in translation with the first part 20 and the second part 30 respectively. Furthermore, the contact surfaces belong to said contact shoulders and are designed geometrically using the same geometric characteristics as those described in FIG. 1. Such an arrangement is advantageous since it makes it possible to prevent friction between the first part 20 and the second part 30.

In the non-limiting example shown in FIG. 2, the first stop shoulder 60 (respectively the second stop shoulder 70) is arranged between the first contact shoulder 200 (respectively the second contact shoulder 300) and the right-hand lateral wall 54 (respectively the left-hand lateral wall 53) such that the first contact shoulder 200 (respectively the second contact shoulder 300) cooperates with the first stop shoulder 60 (respectively the second stop shoulder 70).

Figure 3:
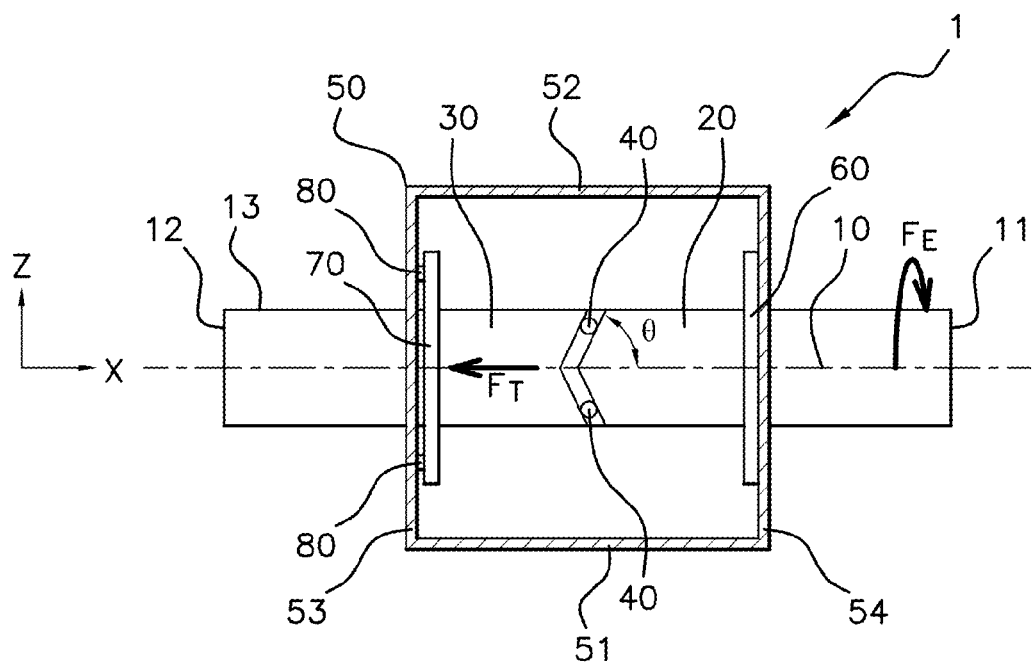
FIGS. 3 and 4: schematic representations of two specific embodiments of the device, respectively in FIG. 1 and FIG. 2, including ball bearings, according to the invention.
Figure 4:
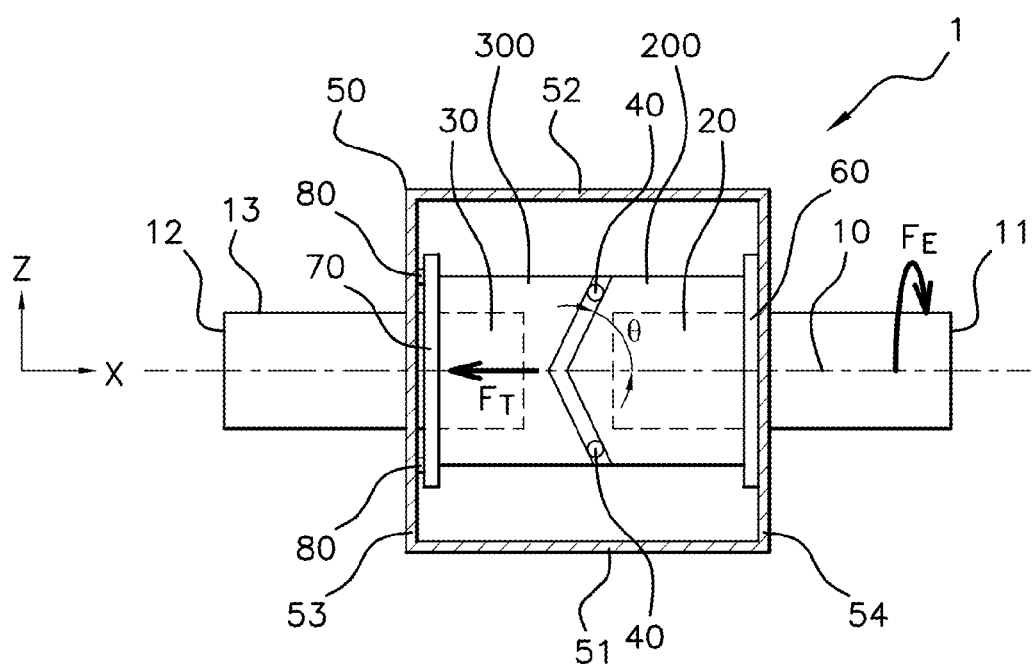

FIGS. 3 and 4 are schematic representations of two specific embodiments of the device 1 respectively in FIG. 1 and in FIG. 2, showing respectively a cross section of the device 1 in which the contact means have ball bearings 40.

For example, and as shown in FIGS. 3 and 4, said ball bearings 40 are arranged between the contact surfaces of the first part 20 and the second part 30 such that each ball 40 is spherical and in contact with a contact surface respectively of the first part 20 and of the second part 30. Such an arrangement is designed firstly to enable the transmission of rotational movement between the first part 20 and the second part 30 on account of the sphericity of said balls, and secondly to transform the rotational movement of one of said parts into a translational movement of the other of said parts, according to exactly the same principle as described above. Such an arrangement is also advantageous in that it makes it possible to reduce friction between the contact surfaces, thereby making the device more robust. Furthermore, said spherical balls 40 are preferably made of a rigid material, such as steel, to ensure that the drive force $F_E$, contact force $F_C$ and translational force $F_T$ are not damped during operation of the device 1.

Figure 5:
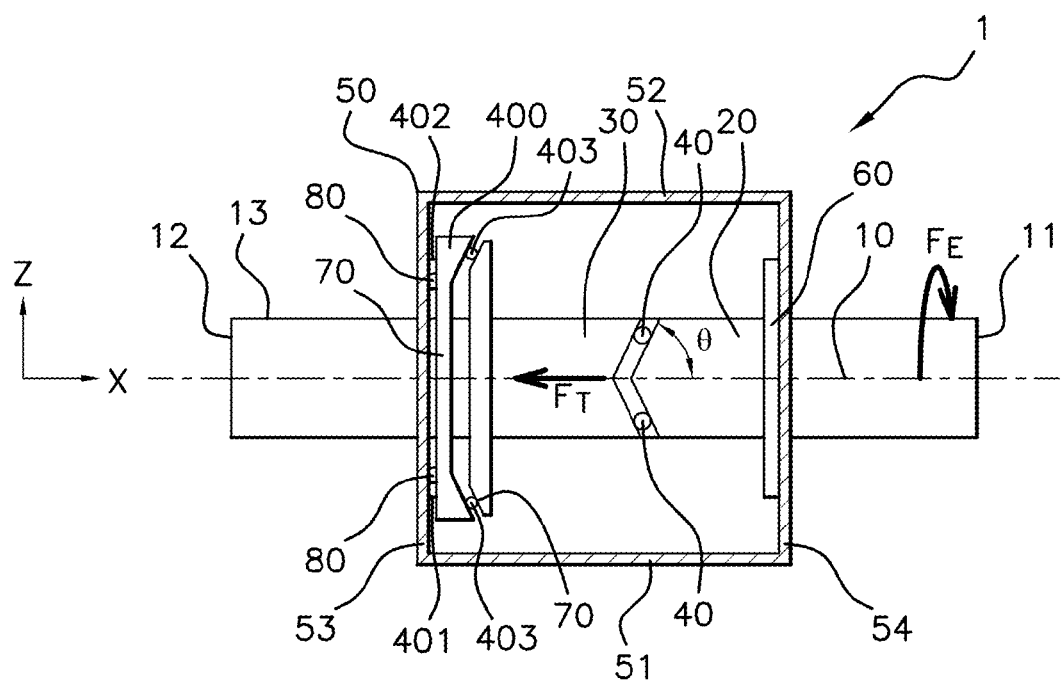
FIG. 5: a schematic representation of a preferred embodiment of the device in FIG. 1, according to the invention.

FIG. 5 is a schematic representation of a preferred embodiment of the device 1 in FIG. 1, showing a cross section of the device 1 in which the contact means have ball bearings 40, as described in FIGS. 3 and 4, and the respective contact surfaces of the first part 20 and the second part 30 are inclined such as to maximize the intensity of the force $F_T$.

For example, and as shown in FIG. 5, the respective contact surfaces of the first part 20 and the second part 30 are each contained in a plane inclined at an angle θ in relation to the axis of rotation of the shaft 10 of the crankset, said angle θ having a value, modulo 90°, within the range [40°, 50°]. Such an arrangement is advantageous since it makes it possible to maximize the intensity of the translational force $F_T$, the optimum being reached for an angle θ of 45°. Subsequently, the compression stress of the sensing elements 80 is maximal.

In the example shown in FIG. 5, the device 1 also has means for transmitting the translational movement to the sensing elements 80. Said transmission means are arranged between said sensing elements 80 and said stop means, and they include a transmission support 400 that is moveable in translation along the axis X and that bears against said sensing elements 80. For example, said transmission support 400 is formed by a peripheral shoulder that is larger than the diameter of the shaft 10 of the crankset, and is not in contact with said shaft 10.

Furthermore, the transmission means preferably include means for reducing friction between the transmission support 400 and the stop means. As shown in FIG. 5, said friction reducing means are tapered roller bearings arranged between said transmission support 400 and the second stop shoulder 70, such that each ball 403 in said bearings is in contact with an oblique surface of said transmission support 400 and of said second stop shoulder 70 respectively.

Such arrangements are advantageous since the transmission support 400 is not in contact with the shaft 10 of the crankset. Consequently, said transmission support 400 does not rotate, and therefore does not create any rotational friction, which could cause damage in the long term, with the sensing elements 80 with which it is in contact. Said transmission support 400 is therefore designed to transfer only the force $F_T$ to said at least one sensing element 80. Subsequently, said at least one sensing element 80 is also not in contact with the rotating shaft 10 of the crankset.

As shown in FIG. 5, the transmission means include for example guide means designed to enable said transmission support 400 to move along the axis X. Said guide means are for example a lower rod 401 and an upper rod 402 held static by gluing, welding or any other means with the left-hand lateral wall 53 of the supporting element 50. Said rods are designed to cooperate respectively with a through-hole of said transmission support 400, which has a circular section and an axis of revolution parallel to the axis X.

In a variant of said preferred embodiment of the device 1, at least one sensing element is also arranged between and in contact with the right-hand lateral wall 54 and the first stop shoulder 60. Furthermore, the device 1 also includes transmission means, with the same characteristics as described above, between the first stop shoulder 60 and said at least one sensing element.

In general, it should be noted that the embodiments discussed above have been described as non-limiting examples, and that other variants are therefore possible.

In particular, the invention has been described in relation to a device 1 carried on a cycle, such as an electric bicycle. However, other examples may include a device 1, having substantially similar characteristics, carried on a motor vehicle.

The invention claimed is:

1. A device for determining the torque applied to a crankset shaft moveable in rotation about an axis of rotation, notably the crankset of a cycle, and including a supporting element, wherein:
   the crankset shaft has two separate parts: a first part and a second part that are respectively moveable in rotation about an axis of rotation,
   the supporting element is designed to keep the first part and the second part substantially coaxial with the axis of rotation of the shaft of the crankset,
   said two parts have respective contact means designed to transform the rotational movement of one of said two parts into a simultaneously translational and rotational movement of the other of said two parts, the contact means being the respective extremities of the two parts, arranged facing one another along the axis of rotation of the shaft of the crankset, said extremities having respectively at least one flat contact surface that is not parallel and not orthogonal to the axis of rotation, said respective contact surfaces of said extremities being designed to bear against one another,
   said two parts have stop means designed to cooperate with said supporting element to limit the amplitude of the relative translational movement of said two parts,
   the device has at least one sensing element arranged between the stop means and the supporting element that is designed to supply a signal representing a mechanical stress applied to said at least one sensing element,
   the device has a processing module configured to determine the torque applied to the crankset shaft as a function of the signal supplied by said at least one sensing element.

2. The device as claimed in claim 1, wherein the respective contact surfaces of the two parts are each contained in a plane inclined at an angle q in relation to the axis of rotation of the shaft of the crankset, said angle q having a value, modulo 90°, within the range [40°, 50°].

3. The device as claimed in claim 2, wherein the contact means include ball bearings arranged between the contact surfaces of said two parts.

4. The device as claimed in claim 2, wherein the left- and right-hand extremities each have a contact shoulder constrained to move in rotation and in translation with respectively the first part and the second part, and to which the contact surfaces belong.

5. The device as claimed in claim 2, wherein the supporting element has lateral walls rigidly connected to one another with through holes formed such that said two parts are engaged therein.

6. The device as claimed in claim 2, wherein said stop means are two respective stop shoulders of said two parts that are constrained to move in translation and in rotation with said two parts, and designed to cooperate with the lateral walls of the supporting element.

7. The device as claimed in claim 2, wherein said at least one sensing element is a piezoresistive or piezoelectric sensor.

8. The device as claimed in claim 2, further comprising means for transmitting the translational movement to said at least one sensing element that are arranged between said at least one sensing element and said stop means, said transmission means including:
   a transmission support that is movable in translation and bears against the at least one sensing element,
   means for reducing friction between said transmission support and the stop means.

9. The device as claimed in claim 1, wherein the contact means include ball bearings arranged between the contact surfaces of said two parts.

10. The device as claimed in claim 1, wherein the left- and right-hand extremities each have a contact shoulder constrained to move in rotation and in translation with respectively the first part and the second part, and to which the contact surfaces belong.

11. The device as claimed in claim 1, wherein the supporting element has lateral walls rigidly connected to one another with through holes formed such that said two parts are engaged therein.

12. The device as claimed in claim 1, wherein said stop means are two respective stop shoulders of said two parts that are constrained to move in translation and in rotation with said two parts, and designed to cooperate with the lateral walls of the supporting element.

13. The device as claimed in claim 1, wherein said at least one sensing element is a piezoresistive or piezoelectric sensor.

14. The device as claimed in claim 1, further comprising means for transmitting the translational movement to said at least one sensing element that are arranged between said at least one sensing element and said stop means, said transmission means including:
   a transmission support that is movable in translation and bears against the at least one sensing element,
   means for reducing friction between said transmission support and the stop means.

15. The device as claimed in claim 14, wherein said friction reducing means are two tapered roller bearings arranged between said transmission support and said stop means.

16. The device as claimed in claim 15, further comprising means for transmitting the translational movement to said at least one sensing element that are arranged between said at least one sensing element and said stop means, said transmission means including:
- a transmission support that is movable in translation and bears against the at least one sensing element,
- means for reducing friction between said transmission support and the stop means.

17. The device as claimed in claim 14, wherein said transmission means include guide means arranged to enable said transmission support to move along the axis of rotation of the shaft of the crankset.

\* \* \* \* \*